(No Model.)
F. T. BROWN, Jr.
HORSE DETACHER.
No. 451,451. Patented May 5, 1891.
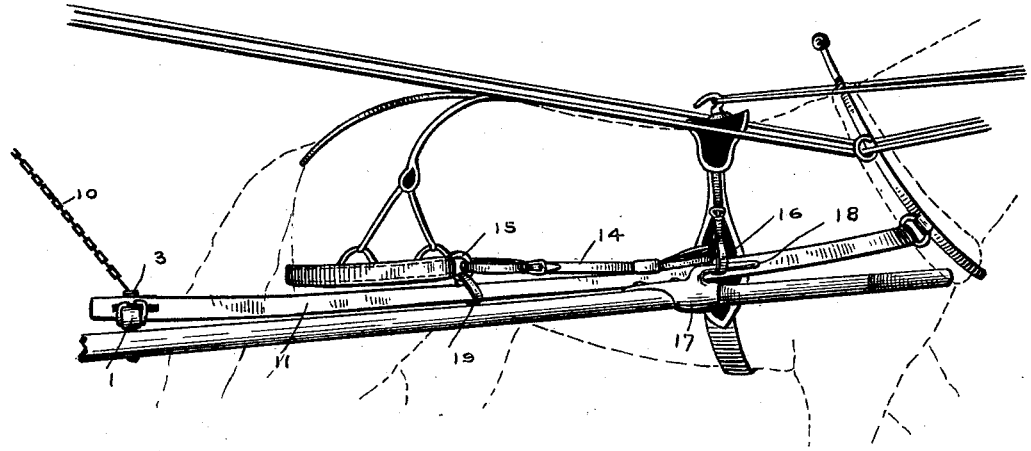
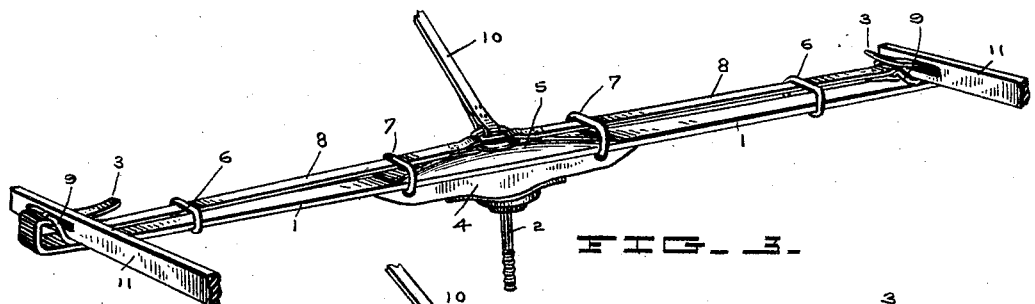
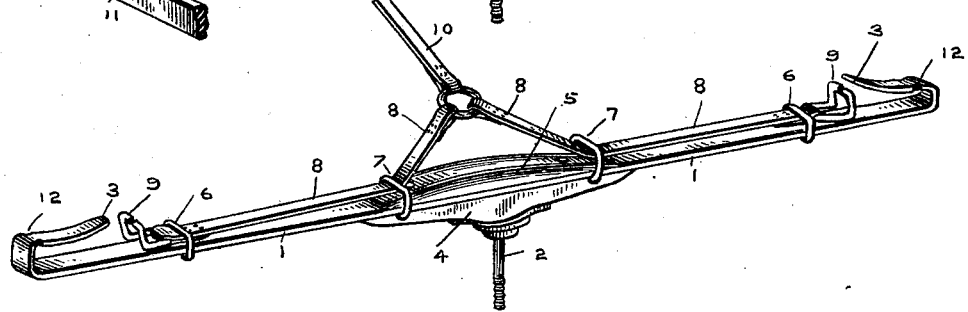
Witnesses
H. D. Nealy.
E. B. Griffith.
Inventor
Fred T. Brown Jr.,
By his Attorney
C. C. Jacobs

UNITED STATES PATENT OFFICE.

FRED T. BROWN, JR., OF GREENCASTLE, INDIANA.

HORSE-DETACHER.

SPECIFICATION forming part of Letters Patent No. 451,451, dated May 5, 1891.

Application filed December 29, 1890. Serial No. 376,154. (No model.)

*To all whom it may concern:*

Be it known that I, FRED T. BROWN, Jr., of Greencastle, county of Putnam, and State of Indiana, have invented certain new and useful Improvements in Horse-Detachers; and I do hereby declare that the following is a full, clear, and exact description thereof, reference being had to the accompanying drawings, in which like letters refer to like parts.

My invention relates to the construction of devices known as "horse-detachers," and will be understood from the following description.

In the drawings, Figure 1 is a side view of a horse coupled to the shafts, showing the construction of the device for releasing the holdback-straps. Fig. 2 is a perspective view of the main releasing device, showing the traces connected to the hooks. Fig. 3 is a similar view, showing the device with the traces detached.

In detail, 1 is a singletree, pivoted by a bolt 2 to the cross-bar of the shafts, this singletree preferably being made of a single strap of iron having its upturned ends formed into hooks 3, as shown. The singletree rests upon a short bolster of wood 4, and preferably has a top piece 5, also made of wood, above, bolts or screws being driven through the wood and body of the singletree, connecting the parts together.

6 are guide-rings rigidly connected to the under side of the singletree, and 7 are similar rings which are hinged in sockets formed in the bolster 4, as shown in Fig. 2.

8 are straps having spring-clamps 9 connected to their outer ends, the inner ends of these straps connected by a ring to the operating chain or strap 10, which extends up over the dash within reach of the driver's hand.

11 are the traces, having the usual slots for slipping over the ends of the hooks.

This part of the device operates as follows: The operator takes hold of the spring-clamp 9 at each end and pulls them outward until the loop passes over the tang of the hook of the singletree. He then loops the trace over the hook and crowds it backward until the spring ends of the clamp 9 engage with the notches 12 in the sides of the hook. This operation forces the clamp 9 downward, so that its lower half is beneath the edge of the trace, as shown in Fig. 2, and the point of connection of the clamp with the strap 8 is lifted above the lower edge of the trace and the latter could not be slipped off, as it would strike against the under side of the strap 8, where it is doubled about the clamp; but if the driver wishes to detach the trace he pulls upon the chain or strap 10. This draws the ends of the straps 8 toward the driver in the position shown in Fig. 3, and this movement acts on the clamp and trace, and the latter slips off the end of the tang of the hook, freeing them from the singletree, the parts taking the position shown in Fig. 3. This releases the horse from connection with the vehicle through the traces.

The holdback straps remain yet to be considered, and they are constructed as follows: This strap is shown in Fig. 1 and marked 14, and one end is passed through the breeching-ring 15 and buckled forward, forming a loop. The other end is passed through the shaft-loop 16 and fastened back, and the strap is not connected or wound about the shaft at all. Instead a short socket 17 is bolted to the shaft, provided with a prong 18, which passes through the shaft-loop 16, and when the traces have been detached from the singletree, as hereinbefore described, and the horse moves forward, the shaft-loop passes off the end of the prong 18, freeing the animal entirely from the vehicle. At 19 is a small loop, also connected to the breeching-ring 15, through which the trace 11 passes, and this loop prevents the trace from falling down under the feet of the horse. As the horse passes out, the shafts may be held up by pulling upon the strap 10 until the animal is entirely clear from the vehicle and then be let down, when the vehicle stops.

What I claim as my invention, and desire to secure by Letters Patent, is the following:

1. In a horse-detacher, a singletree, its ends projecting inward, guide-rings connected to such singletree, and straps sliding beneath such rings, having spring-clamps for passing over and engaging with notches on such projection, in combination with an operating-strap connected to the inner ends of the clamp-straps, substantially as shown and described.

2. A horse-detacher comprising a singletree having a pivot-bolt for connecting it to the cross-bar of the shafts, inwardly-projecting hooks having notches in their sides formed on the ends of such singletree, and straps or bands connected centrally to an operating-strap, their outer ends provided with spring-clamps for slipping over and engaging with the notches on the hooks of the singletree, in combination with a socket secured to such shaft and having a prong above whose free end passes through the shaft-loop of the harness, and with an operating-strap secured within reach of the driver's hand, substantially as shown and described.

In witness whereof I have hereunto set my hand this 17th day of December, 1890.

FRED T. BROWN, Jr.

Witnesses:
E. B. GRIFFITH,
H. D. NEALY.